US 9,781,752 B2

(12) United States Patent
Chaudhuri et al.

(10) Patent No.: US 9,781,752 B2
(45) Date of Patent: Oct. 3, 2017

(54) SYSTEMS AND METHODS FOR EFFECTIVE PHYSICAL CELL IDENTIFIER REUSE

(71) Applicant: WIPRO Limited, Bangalore (IN)

(72) Inventors: Saptarshi Chaudhuri, Bangalore (IN); Avijit Manna, Kolkata (IN); Shyam Sundar Pal, Kolkata (IN)

(73) Assignee: WIPRO LIMITED, Bangalore (IN)

( * ) Notice: Subject to any disclaimer, the term of this patent is extended or adjusted under 35 U.S.C. 154(b) by 293 days.

(21) Appl. No.: 14/595,031

(22) Filed: Jan. 12, 2015

(65) Prior Publication Data

US 2016/0143068 A1 May 19, 2016

(30) Foreign Application Priority Data

Nov. 13, 2014 (IN) ............................ 5721/CHE/2014

(51) Int. Cl.
*H04W 76/02* (2009.01)
*H04L 5/00* (2006.01)
(Continued)

(52) U.S. Cl.
CPC ............. *H04W 76/021* (2013.01); *H04L 1/00* (2013.01); *H04L 5/0048* (2013.01);
(Continued)

(58) Field of Classification Search
None
See application file for complete search history.

(56) References Cited

U.S. PATENT DOCUMENTS

| 8,660,570 B2 | 2/2014 | Han et al. | |
| 2010/0020710 A1* | 1/2010 | Gupta | H04J 11/0093 370/252 |

(Continued)

FOREIGN PATENT DOCUMENTS

| WO | WO 2010132194 | 11/2010 |
| WO | WO 2013078573 | 6/2013 |
| WO | WO 2014029290 | 2/2014 |

OTHER PUBLICATIONS

3GPP TS 36.211 v12.0.0(Dec. 2013). "$3^{rd}$ Generation Pertnership Project, Technical Specification Group Radio Access Network; Evolved Universal Terrestrial Radio Access (E-UTRA); Physical channels and modulation (Release 12)", Dec. 16, 2013, *3GPP*, 120 pages.

Silva C, E.M., et al., "Cell search in Long Term Evolution systems: Primary and secondary synchronization", Feb. 29, 2012, Circuits and Systems (LASCAS), *IEEE*, pp. 1-4.

Kavlak, K., et al., "PCI Planning Strategies for Long Term Evolution Networks", *Networking 2012 Workshops, LNCS 7291*, May 25, 2012, pp. 151-156.

(Continued)

*Primary Examiner* — Michael Thier
*Assistant Examiner* — Kent Krueger
(74) *Attorney, Agent, or Firm* — Finnegan, Henderson, Farabow, Garrett & Dunner, LLP

(57) ABSTRACT

Systems and methods for allocating a physical cell identifier (PCI) to a cell are described. In one implementation, the method comprises identifying allocated physical cell identifiers based on PCI data and generating a near PCI list and a far PCI list based on the allocated PCIs and a RSRP threshold value. Further, the method comprises determining cell group IDs and a cell IDs from the near PCI list and the far PCI list. Further, the method comprises assigning the cell group IDs to a first bin and the cell IDs to a second bin. Further, the method comprises prioritizing the cell group IDs in the first bin based on effective distance and the cell IDs in the second bin based on an effective RSRP value. Further, the method comprises allocating the PCI, to the cell, determined based on the prioritized cell group IDs and the cell IDs.

21 Claims, 4 Drawing Sheets

(51) Int. Cl.
    *H04L 1/00*           (2006.01)
    *H04W 4/00*         (2009.01)
    *H04W 4/02*         (2009.01)
    *H04W 24/02*       (2009.01)
    *H04W 72/00*       (2009.01)

(52) U.S. Cl.
    CPC ........... H04L 5/0053 (2013.01); H04W 4/008 (2013.01); H04W 4/021 (2013.01); H04W 24/02 (2013.01); H04W 72/00 (2013.01)

(56) References Cited

U.S. PATENT DOCUMENTS

| | | | |
|---|---|---|---|
| 2011/0086652 A1* | 4/2011 | So | H04W 24/02 455/501 |
| 2012/0275315 A1 | 11/2012 | Schlangen et al. | |
| 2015/0245221 A1* | 8/2015 | Yiu | H04W 28/24 455/446 |

OTHER PUBLICATIONS

Extended European International Search Report issued in the European Patent OFfice in counterpart European Application No. 15157257.5, dated Aug. 28, 2015. 11 pages.

\* cited by examiner

SYSTEMS AND METHODS FOR EFFECTIVE PHYSICAL CELL IDENTIFIER REUSE

CROSS-REFERENCE TO RELATED APPLICATIONS

This U.S. patent application claims priority under 35 U.S.C. §119 to: Indian Patent Application No. 5721/CHE/2014, filed Nov. 13, 2014. The aforementioned applications are incorporated herein by reference in their entirety

TECHNICAL FIELD

The present subject matter relates to allocation of physical cell identifier (PCI), and, particularly but not exclusively, to systems and methods for effective PCI reuse.

BACKGROUND

Rapid increase in mobile subscribers base and emergence of high bandwidth applications, such as Multimedia Online Gaming (MMOG), mobile TV, web 2.0, High Definition (HD) video streaming, and live meeting, have resulted in large scale increase of mobile data usage. To meet such requirements of the mobile subscribers, 3$^{rd}$ Generation Partnership Project (3GPP) is working on the standardization and development of Long Term Evolution (LTE) network, also referred to as 4G. One of the requirements of LTE is to provide unbroken connections between base stations, also called Evolved Node Bs or eNodeBs or eNBs, and User Equipment (UEs).

In the LTE network, the eNodeB may serve one or more cells and each of these cells is assigned a unique cell ID, referred to as a physical cell identifier (PCI). The PCI is used to identify the cell and the eNodeB to which the cell is associated. As per 3GPP standard, there can be maximum 168 Cell Group Id ($N_{ID}^1$) and 3 Cell Id ($N_{ID}^2$) per Cell Group Id possible in the LTE network. This leads to maximum 504 number of PCI (cells) in the network. In a self-optimizing network (SON), for automatic allocation of a PCI to a cell of a newly installed eNodeB, the new eNodeB may collect information from a neighbouring eNodeB to select the PCI for allocation.

SUMMARY

Disclosed herein are systems and methods for allocating a physical cell identifier (PCI) to a cell in a wireless communication network. In one example, the system comprises a processor, a memory communicatively coupled to the processor, wherein the memory stores processor-executable instructions, which, on execution, cause the processor to identify allocated physical cell identifiers based on PCI data. The processor-executable instructions, on execution, further cause the processor to generate a near PCI list and a far PCI list based on the allocated PCIs and a RSRP threshold value. The processor-executable instructions, on execution, further cause the processor to determine cell group IDs and a cell IDs from the near PCI list and the far PCI list. The processor-executable instructions, on execution, further cause the processor to assign the cell group IDs to a first bin and the cell IDs to a second bin. The processor-executable instructions, on execution, further cause the processor to prioritize the cell group IDs in the first bin based on effective distance between a near PCI and a far PCI and the cell IDs in the second bin based on an effective RSRP value. The processor-executable instructions, on execution, further cause the processor to allocate the PCI, to the cell, determined based on the prioritized cell group IDs and the cell IDs.

Certain embodiments of the present disclosure relates to a method for allocating a physical cell identifier (PCI) to a cell in a wireless communication network comprises identifying allocated physical cell identifiers based on PCI data. Further, the method comprises generating a near PCI list and a far PCI list based on the allocated PCIs and a RSRP threshold value. Further, the method comprises determining cell group IDs and a cell IDs from the near PCI list and the far PCI list. Further, the method comprises assigning the cell group IDs to a first bin and the cell IDs to a second bin. Further, the method comprises prioritizing the cell group IDs in the first bin based on effective distance between a near PCI and a far PCI and the cell IDs in the second bin based on an effective RSRP value. Further, the method comprises allocating the PCI, to the cell, determined based on the prioritized cell group IDs and the cell IDs.

Certain embodiments of the present disclosure also relate to a non-transitory, computer-readable medium storing instructions for allocating a physical cell identifier (PCI) to a cell in a wireless communication network that, when executed by a processor, cause the processor to perform operations comprise identifying allocated physical cell identifiers based on PCI data. Further, the operations comprise generating a near PCI list and a far PCI list based on the allocated PCIs and a RSRP threshold value. Further, the operations comprise determining cell group IDs and a cell IDs from the near PCI list and the far PCI list. Further, the operations comprise assigning the cell group IDs to a first bin and the cell IDs to a second bin. Further, the operations comprise prioritizing the cell group IDs in the first bin based on effective distance between a near PCI and a far PCI and the cell IDs in the second bin based on an effective RSRP value. Further, the operations comprise allocating the PCI, to the cell, determined based on the prioritized cell group IDs and the cell IDs.

Additional objects and advantages of the present disclosure will be set forth in part in the following detailed description, and in part will be obvious from the description, or may be learned by practice of the present disclosure. The objects and advantages of the present disclosure will be realized and attained by means of the elements and combinations particularly pointed out in the appended claims.

It is to be understood that the foregoing general description and the following detailed description are exemplary and explanatory only, and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
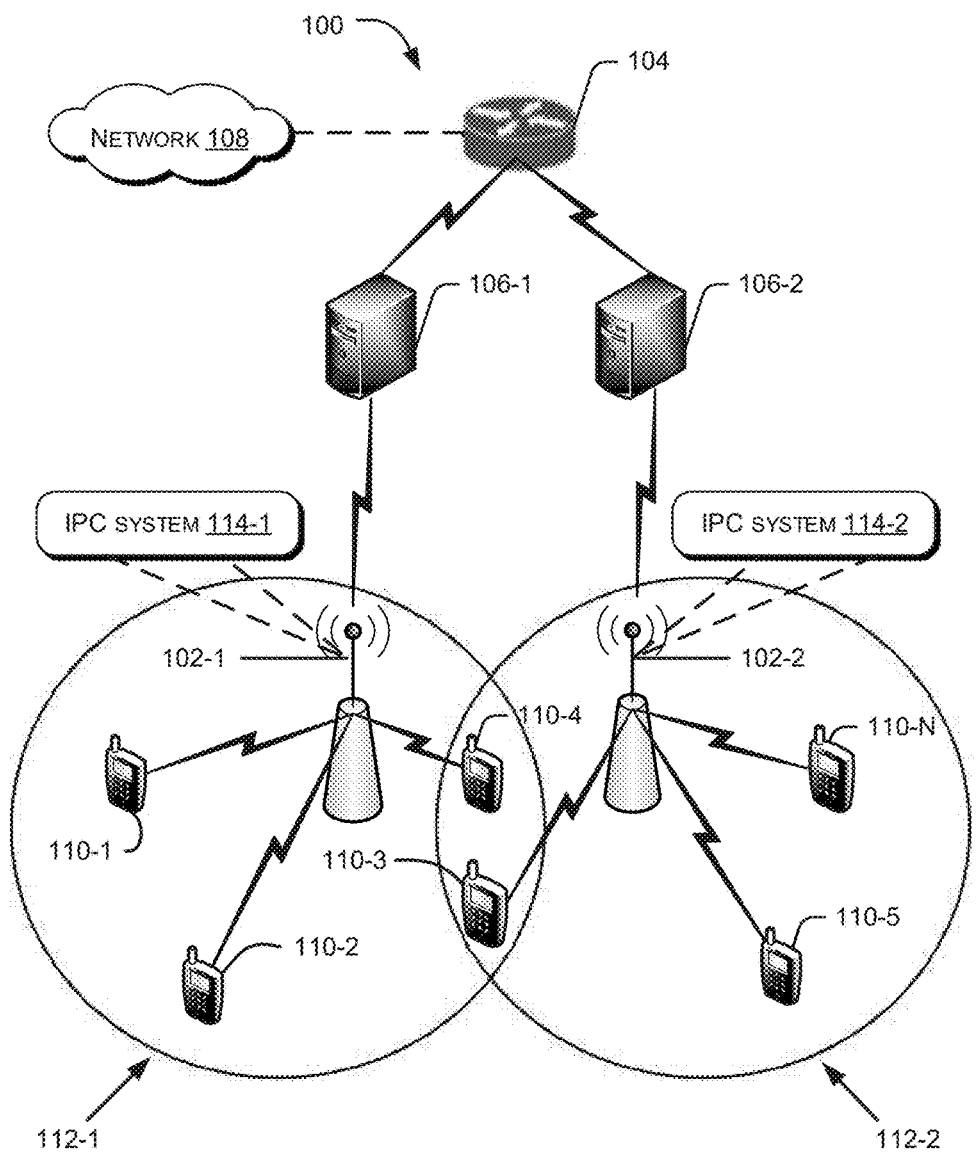
FIG. 1 illustrates an exemplary network environment for allocating a physical cell identifier (PCI) to a cell, in accordance with some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

The present subject matter discloses systems and methods for allocating a physical cell identifier (PCI) to a cell in a wireless communication network. The systems and methods may be implemented in a variety of computing systems. The computing systems that can implement the described method(s) include, but are not limited to a server, a desktop computer, and a mainframe computer. Although the description herein is with reference to certain computing systems, the systems and methods may be implemented in other computing systems, albeit with a few variations, as will be understood by a person skilled in the art.

In a self-optimizing network (SON), there are some conventional techniques through which base stations, also referred to as eNodeBs, allocate physical cell Identifiers (PCIs) to their own cells. Since number of PCIs available in a LTE network is limited to 504, some of the techniques may reuse PCIs in order to allow the eNodeBs to serve more than 504 cells. In one conventional approach, the eNodeB may obtain information about selectable PCIs from neighboring eNodeBs. In this approach, the network may need an X2 interface connectivity among neighboring eNodeBs. Therefore, for an eNodeB with relatively large number of neighbors, there may be additional overhead of such information exchanges and overhead on the network as well. Also, in case the X2 interface is not available, the conventional approach may fail to work.

In another conventional approach, the PCIs may be allocated based on a relative distance between a new cell and a neighbor cell. In this approach, signal strength is measured with respect to threshold signal strength and accordingly distance is measured between a new eNodeB and a neighbor eNodeB. Further, PCI of farthest base station may be allocated to the new eNodeB. In such cases, if user equipment (UE) is more or less equidistant from more than one cell having reused PCI, the UE may be confused about which cell (eNodeB) to continue to be attached to. This may lead to longer cell-search procedure and improper handover.

For efficient and effective allocation of PCIs in a LTE network, the present subject matter discloses an intelligent PCI configuration (IPC) system. In one implementation, the IPC system may be configured within an eNodeB for allocation of the PCIs. In one implementation, the IPC system may be present outside the eNodeB and communicate with eNodeB for allocation of the PCIs.

In the present subject matter, to allocate a PCI to a cell, the IPC system may determine PCIs that are already allocated based on PCI data. Thereafter, based on the allocated PCIs, a near PCI list and a far PCI list may be generated. In an example, a reference signal received power (RSRP) threshold value of PCIs may be used to obtain the near PCI list and the far PCI list. Subsequently, cell group IDs ($N_{ID}^1$) and a cell IDs ($N_{ID}^2$) from the near PCI list and the far PCI list may be determined and assigned to a first bin and a second bin. Further, in the first bin and the second bin, the $N_{ID}^1$ and the $N_{ID}^2$ may be ranked or prioritized based on effective distance between a near PCI and a far PCI and an effective RSRP value, respectively. Thereafter, highest ranked $N_{ID}^1$ and the $N_{ID}^2$ may be selected for computation of the PCI, which is then allocated to the cell.

Working of the systems and methods for allocating a physical cell identifier (PCI) to a cell in a wireless communication network is described in conjunction with FIGS. 1-4. It should be noted that the description and drawings merely illustrate the principles of the present subject matter. It will thus be appreciated that those skilled in the art will be able to devise various arrangements that, although not explicitly described or shown herein, embody the principles of the present subject matter and are included within its spirit and scope. Furthermore, all examples recited herein are principally intended expressly to be only for pedagogical purposes to aid the reader in understanding the principles of the present subject matter and are to be construed as being without limitation to such specifically recited examples and conditions. Moreover, all statements herein reciting principles, aspects, and embodiments of the present subject matter, as well as specific examples thereof, are intended to encompass equivalents thereof. While aspects of the systems and methods can be implemented in any number of different computing systems environments, and/or configurations, the embodiments are described in the context of the following exemplary system architecture(s).

FIG. 1 illustrates an exemplary network environment 100 for allocating a physical cell identifier to a cell, in accordance with some embodiments of the present disclosure. As shown in FIG. 1, eNodeB 102-1 and eNodeB 102-2 are communicatively coupled to a packet data network gateway (PDN-GW) 104 through Mobile Management Entity/Serving Gateway (MME/SGW) 106-1 and MME/SGW 106-2, respectively. Hereinafter, the eNodeB 102-1 and the eNodeB 102-2 may be collectively referred to as eNodeBs 102 and individually referred to as eNodeB 102. The MME/SGW 106-1 and 106-2 are responsible for paging and tagging procedure including retransmissions and forwarding data packets. Further, the PDN-GW 104 is communicatively coupled to a network 108. The network 108 may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the network 108 may include a variety of network devices, including routers, bridges, servers, computing devices, storage devices, etc.

As shown in FIG. 1, the eNodeBs 102 are communicatively coupled to a plurality of user equipment 110-1, 110-2 . . . 110-N, collectively referred to as user equipment 110. The eNodeBs 102 have their respective coverage area, i.e., eNodeB coverage area 112-1 and eNodeB coverage area 112-2 in which the user equipment 110 are operating. In one example, the eNodeB 102 may serve one or more cells in which the user equipment 110 can operate. In such case, the eNodeB 102 may need to allocate a physical cell identifier (PCI) to a cell from amongst the one or more cells. In case, a new eNodeB is being deployed and all the 504 PCIs are allocated to the cell, the eNodeB may reuse the PCIs for allocation.

As shown in FIG. 1, the eNodeB 102-1 and the eNodeB 102-2 comprise an intelligent PCI configuration (IPC) system 114-1 and an IPC system 114-2. Hereinafter, the IPC system may be individually referred to as IPC system 114. In one implementation, the IPC system 114 is configured within the eNodeB 102 for effectively allocating the PCI. The IPC system 114 determines the PCI to be allocated to the cell and a maximum transmit power at which the eNodeB 102 can operate for the allocated PCI. Although, in FIG. 1, the IPC system 114 is shown as a part of the eNodeB 102, it may be understood that the IPC system 114 can also be present external to the eNodeB 102 as a separate entity and allocate the PCI by communicating with the eNodeB 102. Working and components of the IPC system 114 have been discussed in conjunction with FIG. 2.

Figure 2:
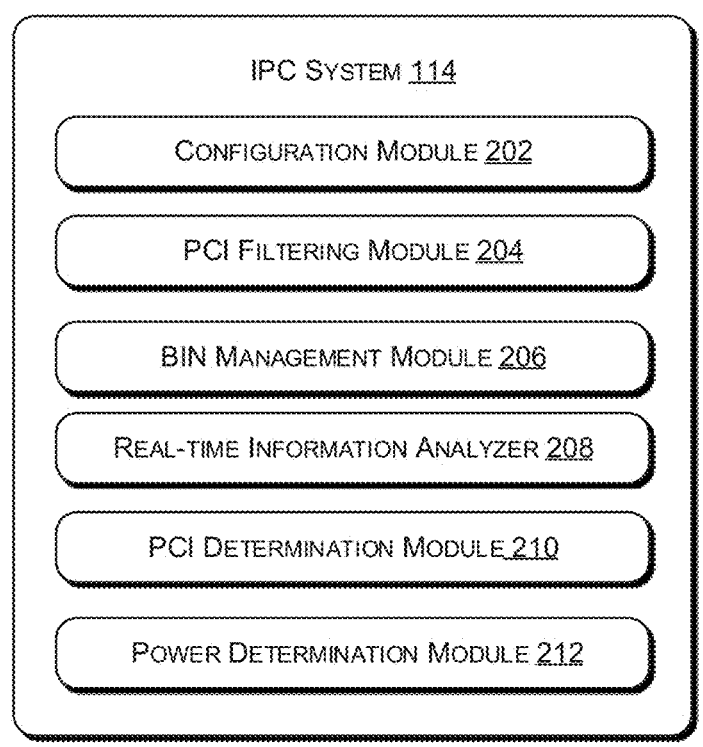
FIG. 2 illustrates various components of an Intelligent PCI configuration (IPC) system for allocating a PCI, in accordance with some embodiments of the present disclosure

FIG. 2 illustrates various components of the IPC system 114, in accordance with some embodiments of the present disclosure. As shown in FIG. 2, the IPC system 114 comprises a configuration module 202, a PCI filtering module 204, a bin management module 206, a selection module 208, a PCI determination module 210, and a power determination module 212.

In operation when the eNodeB 102 is getting deployed or the eNodeB 102 needs to allocate a PCI to a cell, the configuration module 202 may receive a cell search report for a neighbor cell of the eNodeB 102. In one example, the configuration module 202 may receive the cell search report from Radio Resource Control (RRC) and Radio Resource Management (RRM) components through a communication interface or in-memory data sharing. Then, the configuration module 202 may obtain PCI data from the cell search report. The PCI data may comprise a detected PCI list (PCIList$_{Det}$), a cell reuse weightage ($\lambda_{CELL}$), a current RSRP threshold value ($\Omega_{TH}$), a PCI count, and maximum and minimum RSRP of neighboring base stations or eNodeBs 102.

In an example, the detected PCI list may comprise PCIs that are already allocated to neighboring eNodeBs 102 and have RSRP values higher than the current threshold RSRP value. Further, a non-detected PCI list (PCIList$_{NonDet}$) may be obtained by listing the allocated PCIs having RSRP value below the current threshold RSRP value. The cell reuse weightage indicates a PCI reuse factor when neighbor base stations with same PCI are reported by the UE. The PCI count indicates number of times PCI of a neighboring eNodeB is reported by UEs.

Once the allocated PCIs are determined based on the PCI data, the PCI filtering module 204 may generate a near PCI list (PCIList$_{near}$) and a far PCI list (PCIList$_{Far}$) based on the allocated PCIs. In an example, the PCI filtering module 204 may obtain the list of allocated PCIs and their corresponding RSRP values from the PCI data. Thereafter, the PCI filtering module 204 may obtain the detected PCI list and the non-detected PCI list by comparing the RSRP values with the current threshold RSRP value. The PCI filtering module 204 may then determine a modified threshold RSRP value ($\delta TH\_CELL$) for the cell to generate the near PCI list and the far PCI list from the detected PCI list and the non-detected PCI list. In an example, the PCI filtering module 204 may obtain the modified threshold RSRP value using Equation 1.

$$\delta TH\_CELL=(RSRP_{max}-RSRP_{min})*\Omega_{TH} \quad \text{(Equation 1)}$$

The RSRP$_{max}$ and RSRP$_{min}$ are maximum RSRP value and minimum RSRP value respectively. The maximum RSRP and the minimum RSRP value may be determined from the current threshold RSRP value obtained for the eNodeB 102.

Upon obtaining the modified threshold RSRP value, the PCI filtering module 204 generates the near PCI list and the far PCI list by comparing the RSRP values of the PCIs with the modified threshold RSRP value.

In an example, the PCI filtering module 204 may check whether the non-detected PCI list is empty or not. In case, the PCI filtering module 204 determines that the non-detected PCI list is non-empty, the PCI filtering module 204 may use the detected PCI list as the near PCI list and the non-detected PCI list as the far PCI list. On the other hand, if the PCI filtering module 204 determines that the non-detected PCI list is empty, the PCI filtering module 204 may consider the detected PCI list for generating the near PCI list and the far PCI list. The PCI filtering module 204 may compare the RSRP values of the PCIs with the modified threshold RSRP value of the cell. The PCI filtering module 204 generates the near PCI list by listing the PCIs having RSRP higher than the modified threshold RSRP value. Similarly, the PCI filtering module 204 may generate the far PCI list by listing PCIs having RSRP lower than the modified threshold RSRP value. Thus, the PCI filtering module 204 generates the near PCI list and the far PCI list.

Subsequently, the bin management module 206 may obtain the near PCI list and the far PCI list to determine cell group IDs and cell IDs. The bin management module 206 may create a first bin and a second bin to which the cell groups IDs and the cell IDs are assigned. In an example, the cell group IDs may be assigned to the first bin and the cell IDs may be assigned to the second bin. Further, the bin management module 206 may prioritize the cell group IDs in the first bin and the cell IDs in the second bin. The bin management module 206 may prioritize the cell group IDs based on effective distance between a near PCI and a far PCI and cell IDs based on the effective RSRP value.

In an example, to prioritize the cell IDs in the second bin, the bin management module 206 may derive $N_{ID}^{3}$ for each $j^{th}$ element in the far PCI list.

Thereafter, the bin management module 206 may update the second bin with $N_{ID}^{2}Bin(BinN_{ID}^{2}<N_{ID}^{2}>)$.

Further, the bin management module 206 may calculate effective RSRP for each $N_{ID}^{2}$ from the near PCI List using Equation 2.

$$EffRsrp\_N_{ID}^{2}j=f(Count\_N_{ID}^{2}j,RSRP<n>) \quad \text{(Equation 2)}$$

where "f" is a function and Count_$N_{ID}^{2}$j is number of counts of $j^{th}$ $N_{ID}^{2}$.

Subsequently, based on the effective RSRP value (EffRsrp_$N_{ID}^{2}$j), the bin management module 206 prioritizes or ranks the $N_{ID}^{2}$.

In an example, to prioritize the cell group IDs in the first bin, in first step, the bin management module 206 may derive $N_{ID}^{2}$ for each $u^{th}$ element in the far PCI list. Then, the bin management module 206 may check if $N_{ID}^{2}$u is same as $N_{ID}^{2}$Final. The $N_{ID}^{2}$Final is the $N_{ID}^{2}$ with highest priority in the second bin.

In second step, in case the $N_{ID}^2u$ is same as $N_{ID}^2Final$, the bin management module 206 may derive $N_{ID}^1u$ from PCI and calculate $m_0$ $(N_{ID}^1(m_0)u)$ AND m1 $(N_{ID}^1(m_1)u)$ based on $N_{ID}^1u$ as per standard method. On the other hand, if the $N_{ID}^2u$ is not same as $N_{ID}^2Final$, the bin management module 206 may repeat the first step for a different element in the far PCI list.

In third step, the bin management module 206 may derive $N_{ID}^1v$ from PCI for each $v^{th}$ element in the near PCI list and determine $m_0$ for $N_{ID}^1v$ as $(N_{ID}^1(m_0)v)$ and $m_1$ $N_{ID}^1v$ as $(N_{ID}^1(m_1)v)$ for $v^{th}$ element. Thereafter, the bin management module 206 may determine relative distance between a near PCI and a far PCI using Equation 3 and 4.

$$Rel_{m0val,u,v} = ABS((N_{ID}^1(m_0)u) - (N_{ID}^1(m_0)v)) \quad \text{(Equation 3)}$$

$$Rel_{m1val,u,v} = ABS((N_{ID}^1(m_1)u) - (N_{ID}^1(m_1)v)) \quad \text{(Equation 4)}$$

In equation 2 and 3, ABS is the absolute value.

In fourth step, the bin management module 206 may calculate effective distance between the near PCI and the far PCI. The bin management module 206 may calculate the effective distance between the near PCI and the far PCI using Equation 5.

$$Eff_{m0m1val,u,v} = Rel_{m0val,u,v} + Rel_{m1val,u,v} \quad \text{(Equation 5)}$$

Where $Rel_{m0val}$ is relative $m_0$ between the near PCI and the far PCI and $Rel_{m1val}$ is relative m1 between the near PCI and the far PCI.

In fifth step, the bin management module 206 may check if $Eff_{m0m1val,u,v} < Eff_{m0m1val,u,v-1}$. If this condition is true, the bin management module 206 may update the first bin with $(BinN_{ID}^1 < N_{ID}^1, Eff_{m0m1val})$. If this condition is false, then the bin management module 206 may repeat the steps again from the third step. In this manner, the cell group IDs are prioritized or ranked in the first bin and updated by the bin management module 206.

Upon prioritization of the cell group IDs and the cell IDs, the selection module 208 may select the cell group IDs and the cell IDs based on the prioritization for determining the PCI to be allocated to the cell. The selection module 208 may select the cell group IDs based on the effective distance $(Eff_{m0m1val})$ between the near PCI and the far PCI and the cell IDs based on the effective RSRP value. In an example, the selection module 208 may select $1^{st}$ ranked or highest priority $N_{ID}^2$ from the second bin and $1^{st}$ ranked or highest priority $N_{ID}^1$ from the first bin. Once the $N_{ID}^1$ and the $N_{ID}^2$ are selected, the selection module 208 may send the $N_{ID}^1$ and the $N_{ID}^2$ to the PCI determination module 210.

The PCI determination module 210 may determine the PCI for allocation using Equation 6.

$$PCI = 3 * N_{ID}^1 + N_{ID}^2 \quad \text{(Equation 6)}$$

Thereafter, the PCI determination module 210 may send the PCI to the configuration manager. The configuration manager may then assign the PCI to the cell and store the allocated PCI in persistent memory. The allocated PCI may also be referred to as a final PCI ($PCI_{Final}$).

Further, the IPC system 114 may determine maximum power transmit for the PCI. The power determination module 212 may determine the maximum power transmit based on a threshold received power and a power hysteresis between reused PCIs. In an example, the power determination module 212 may extract RSRP power from the cell search report. Then, the power determination module 212 checks whether the non-detected PCI list is empty for calculating the final PCI.

If the non-detected PCI list is not empty then only the PCI obtained from the CM is reported. Else, the step of checking whether the non-detected PCI list is empty is repeated.

Further, if the non-detected PCI list is empty, the power determination module 212 may receive transmit power ($TXPow_{FarCell}$) of the final PCI from the far PCI list. Then, the power determination module 212 may calculate a path loss ($PathLoss_{Farcell}$) for the final PCI from the far PCI list based on the transmit power. Thereafter, the power determination module 212 may calculate a far cell distance ($Distance_{Farcell}$) from the final PCI in the far PCI list based on the transmit power, the path loss, and a threshold received power (µTH_CELL) for the path loss. Upon calculating the distance, the power determination module 212 may determine the maximum transmit power ($TXPowMax_{Final}$) of the eNodeB 102 based on the far cell distance, the path loss, and received power hysteresis between reused PCIs (µTH_CELL).

Thus, the present subject matter discloses an effective method and system to allocate the physical cell identifier to a cell. The present subject matter can effectively reuse the PCIs so that there is no collision or interference of PCIs. Also, since the list of allocated PCIs is obtained from the cell search report of a neighboring cell, the system can allocate the PCIs to cells even if communication with neighboring eNodeBs is not possible.

Figure 3:
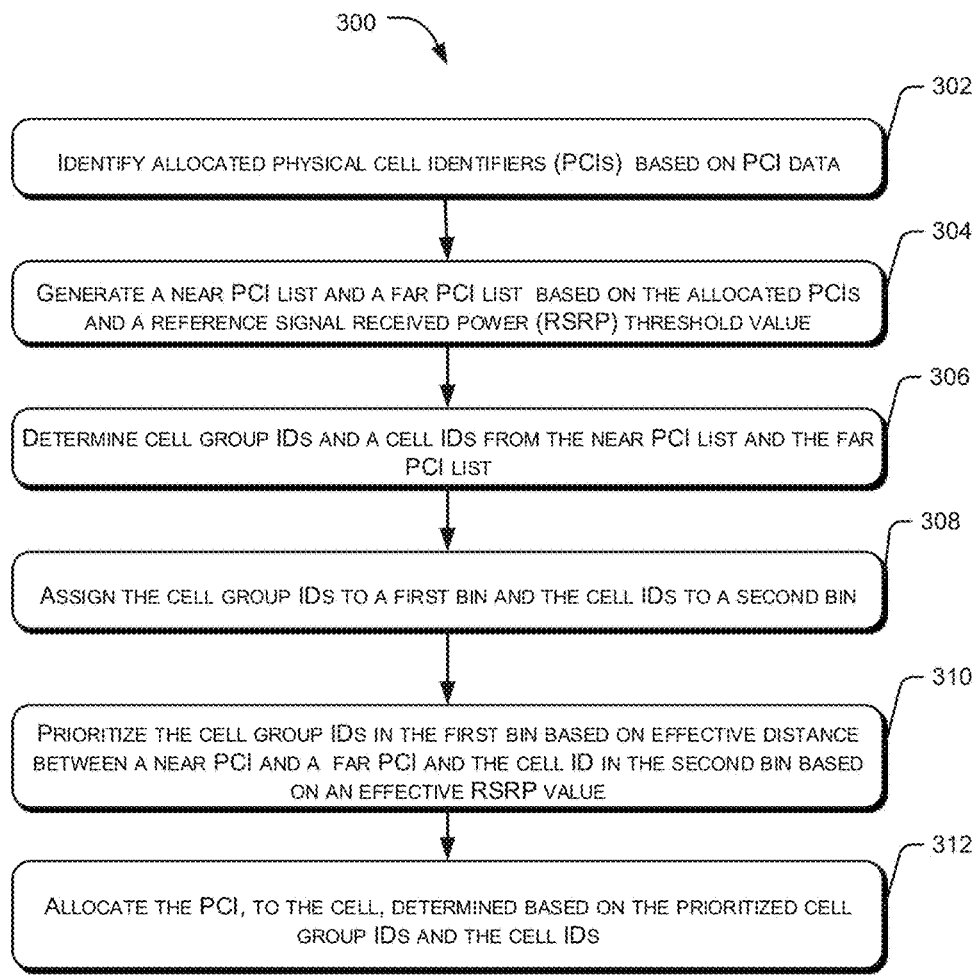
FIG. 3 illustrates an exemplary computer implemented method for allocating a physical cell identifier (PCI), in accordance with some embodiments of the present disclosure.

FIG. 3 illustrates an exemplary computer implemented method for allocating a physical cell identifier (PCI), in accordance with some embodiments of the present disclosure.

The method 300 may be described in the general context of computer executable instructions. Generally, computer executable instructions can include routines, programs, objects, components, data structures, procedures, modules, and functions, which perform particular functions or implement particular abstract data types. The method 300 may also be practiced in a distributed computing environment where functions are performed by remote processing devices that are linked through a communication network. In a distributed computing environment, computer executable instructions may be located in both local and remote computer storage media, including memory storage devices.

The order in which the method 300 is described is not intended to be construed as a limitation, and any number of the described method blocks can be combined in any order to implement the method 300 or alternative methods. Additionally, individual blocks may be deleted from the method 300 without departing from the spirit and scope of the subject matter described herein. Furthermore, the method 300 can be implemented in any suitable hardware, software, firmware, or combination thereof.

With reference to method 300 as depicted in FIG. 3, as shown in block 302, allocated physical cell identifiers (PCIs) in a communication network are identified based on PCI data. In an example, the PCI data may be obtained from a cell search report of a neighboring cell. The PCI data may comprise various parameters, such as a detected PCI list, a cell reuse weightage, a current RSRP threshold value, a PCI count, and maximum and minimum RSRP from neighboring base stations (BTs). In an example, the configuration manager may identify the allocated PCIs based on the PCI data.

At block 304, a near PCI list and a far PCI list are generated based on the allocated PCIs and a RSRP threshold value. In an example, the PCI filtering module 204 obtains the allocated PCIs and analyzes the PCIs to generate the near PCI list and the far PCI list. In one example, the PCI filtering module 204 may list PCIs in the near PCI list that have RSRP higher than the RSRP threshold value. Similarly, the PCI filtering module 204 may list PCIs in the far PCI list that have RSRP lower than the RSRP value and non-detected PCIs.

At block 306, cell group IDs and a cell IDs are determined from the near PCI list and the far PCI list. In an example, the bin management module 206 may determine the cell group IDs and the cell IDs by analyzing the near PCI list and the far PCI list.

At block 308, the cell group IDs and the cell IDs are assigned to a first bin and a second bin, respectively. In an example, the bin management module 206 may create the first bin and the second bin. Thereafter, the bin management module 206 may assign the cell group IDs to the first bin and the cell IDs to the second bin.

At block 310, the cell group IDs are prioritized in the first bin based on effective distance between the near PCI and the far PCI and the cell IDs are prioritized in the second bin based on an effective RSRP value. In an example, the bin management module 206 determines the effective distance based on relative indices ($Rel_{m0}$ and $Rel_{m1}$). The relative indices are derived from the cell group IDs. Thereafter, based on the effective distance, the bin management module 206 prioritizes or ranks the cell group IDs in the first bin. Further, the bin management module 206 determines the effective RSRP value and prioritizes the cell IDs in the second bin based on the effective RSRP value.

At block 312, PCI is allocated to the cell. The PCI is determined based on the prioritized cell group IDs and the cell IDs. In an example, the selection module 208 may select a cell group ID with highest priority from the first bin and a cell ID with highest priority from the second bin to determine the PCI. Thereafter, the PCI determination based on the selected cell group ID and the cell ID determines the PCI to be allocated to the cell. The PCI determination module 210 may then send the PCI to the configuration manager, where the PCI can be stored in the persistent memory. In an example, a maximum power transmit is also determined for the PCI based on a threshold received power and a power hysteresis between reused PCIs. The maximum transmit power may be then stored in the persistent memory of the configuration manager.

Computer System

Figure 4:
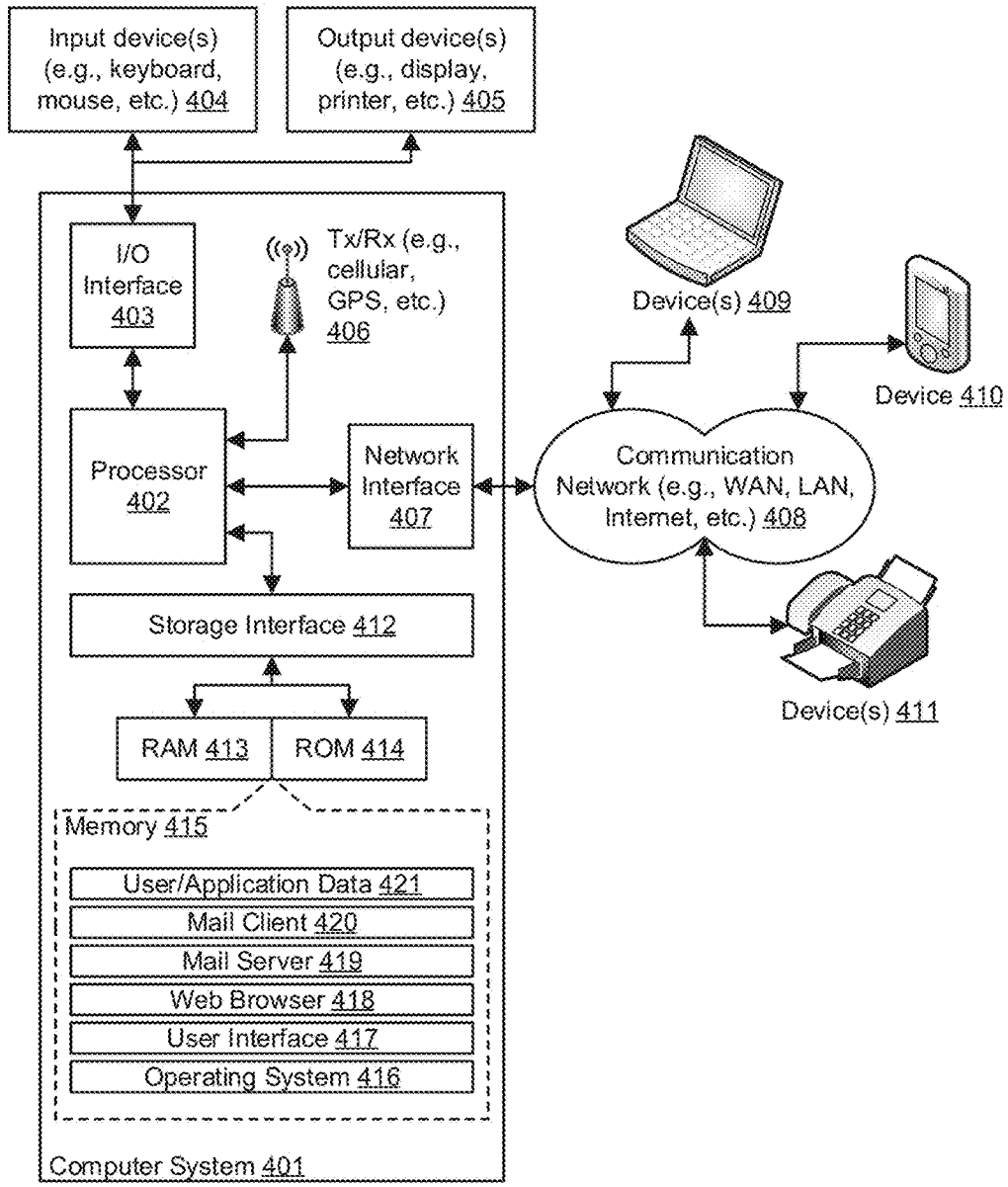
FIG. 4 is a block diagram of an exemplary computer system for implementing embodiments consistent with the present disclosure.

FIG. 4 is a block diagram of an exemplary computer system for implementing embodiments consistent with the present disclosure. Variations of computer system 401 may be used for implementing any of the devices presented in this disclosure. Computer system 401 may comprise a central processing unit ("CPU" or "processor") 402. Processor 402 may comprise at least one data processor for executing program components for executing user- or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 402 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 402 may be disposed in communication with one or more input/output (I/O) devices via I/O interface 403. The I/O interface 403 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 403, the computer system 401 may communicate with one or more I/O devices. For example, the input device 404 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 405 may be a printer, fax machine, video display (e.g., cathode ray tube (CRT), liquid crystal display (LCD), light-emitting diode (LED), plasma, or the like), audio speaker, etc. In some embodiments, a transceiver 406 may be disposed in connection with the processor 402. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 402 may be disposed in communication with a communication network 408 via a network interface 407. The network interface 407 may communicate with the communication network 408. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 408 may include, without limitation, a direct interconnection, local area network (LAN), wide area network (WAN), wireless network (e.g., using Wireless Application Protocol), the Internet, etc. Using the network interface 407 and the communication network 408, the computer system 401 may communicate with devices 410, 411, and 412. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 401 may itself embody one or more of these devices.

In some embodiments, the processor 402 may be disposed in communication with one or more memory devices (e.g., RAM 413, ROM 414, etc.) via a storage interface 412. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc.

The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 416, user interface application 417, web browser 418, mail server 419, mail client 420, user/application data 421 (e.g., any data variables or data records discussed in this disclosure), etc. The operating system 416 may facilitate resource management and operation of the computer system 401. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 417 may facilitate display, execution, interaction, manipulation, or operation of program components through textual or graphical facilities. For example, user interfaces may provide computer interaction interface elements on a display system operatively connected to the computer system 401, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 401 may implement a web browser 418 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 401 may implement a mail server 419 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 401 may implement a mail client 420 stored program component. The mail client may be a mail viewing application, such as Apple Mail, Microsoft Entourage, Microsoft Outlook, Mozilla Thunderbird, etc.

In some embodiments, computer system 401 may store user/application data 421, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

The specification has described systems and methods for allocating a physical cell identifier (PCI) to a cell in a wireless communication network. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

The invention claimed is:

1. A computer-implemented method for allocating a physical cell identifier (PCI) to a cell in a wireless communication network, the method comprising:
   identifying, by a processor, allocated physical cell identifiers (PCIs) based on PCI data, the allocated PCIs comprising near PCIs and far PCIs;
   generating, by the processor, a near PCI list and a far PCI list based on the allocated PCIs and a reference signal received power (RSRP) threshold value;
   determining, by the processor, cell group IDs and a-cell IDs from the near PCI list and the far PCI list;
   assigning, by the processor, the cell group IDs to a first bin and the cell IDs to a second bin;
   prioritizing, by the processor, the cell group IDs in the first bin based on effective distance between a near PCI and a far PCI and the cell IDs in the second bin based on an effective RSRP value, wherein the effective distance between the near PCI and the far PCI is determined based on relative indices derived from the cell group IDs; and
   allocating, by the processor, the PCI, to the cell, determined based on the prioritized cell group IDs and the cell IDs.

2. The method of claim 1 further comprises determining maximum power transmit for the PCI based on a threshold received power and a power hysteresis between reused PCIs.

3. The method of claim 1, wherein the PCI data is received from a cell search report of a neighbor cell.

4. The method of claim 1, wherein the PCI data comprises a detected PCI list, a cell reuse weightage, a current RSRP threshold value, a PCI count, and maximum and minimum RSRP from neighboring base stations (BTs).

5. The method of claim 1, wherein the near PCI is selected from the near PCI list and the far PCI is selected from the far PCI list.

6. The method of claim 1, wherein the near PCI list comprises PCIs having RSRP higher than the RSRP threshold value and the far PCI list comprises PCIs having RSRP lower than the RSRP threshold value and non-detected PCIs.

7. The method of claim 1, wherein allocating the PCI further comprises:
   selecting a cell group ID with highest priority from the first bin;
   selecting a cell ID with highest priority from the second bin; and
   determining the PCI, to be allocated to the cell, based on the cell group ID and the cell ID.

8. A system for allocating a physical cell identifier (PCI) to a cell in a wireless communication network, the system comprising:
   a processor operatively coupled to a memory device, wherein the processor is configured to execute instructions stored in the memory device to perform operations comprising:
   identifying allocated physical cell identifiers (PCIs) based on PCI data, the allocated PCIs comprising near PCIs and far PCIs;
   generating a near PCI list and a far PCI list-based on the allocated PCIs and a reference signal received power (RSRP) threshold value;
   determining cell group IDs and cell IDs from the near PCI list and the far PCI list;
   assigning the cell group IDs to a first bin and the cell IDs to a second bin;
   prioritizing the cell group IDs in the first bin based on effective distance between a near PCI and a far PCI and the cell IDs in the second bin based on an effective RSRP value, wherein the effective distance between the near PCI and the far PCI is determined based on relative indices derived from the cell group IDs; and
   allocating the PCI, to the cell, determined based on the prioritized cell group IDs and the cell IDs.

9. The system of claim 8, wherein the operations further comprise determining maximum power transmit for the PCI based on a threshold received power and a power hysteresis between reused PCIs.

10. The system of claim 8, wherein the PCI data is received from a cell search report of a neighbor cell.

11. The system of claim 8, wherein the PCI data comprises a detected PCI list, a cell reuse weightage, a current RSRP threshold value, a PCI count, and maximum and minimum RSRP from neighboring base stations (BTs).

12. The system of claim 8, wherein the near PCI is selected from the near PCI list and the far PCI is selected from the far PCI list.

13. The system of claim 8, wherein the near PCI list comprises PCIs having RSRP higher than the RSRP threshold value and the far PCI list comprises PCIs having RSRP lower than the RSRP threshold value and non-detected PCIs.

14. The system of claim 8, wherein the operations of allocating the PCI further comprise:
   selecting a cell group ID with highest priority from the first bin;
   selecting a cell ID with highest priority from the second bin; and
   determining the PCI, to be allocated to the cell, based on the cell group ID and the cell ID.

15. A non-transitory, computer-readable medium storing instructions for allocating a physical cell identifier (PCI) to a cell in a wireless communication network that, when executed by a processor, cause the processor to perform operations comprising:
   identifying allocated physical cell identifiers (PCIs) based on PCI data, the allocated PCIs comprising near PCIs and far PCIs;
   generating a near PCI list and a far PCI list-based on the allocated PCIs and a reference signal received power (RSRP) threshold value;
   determining cell group IDs and cell IDs from the near PCI list and the far PCI list;
   assigning the cell group IDs to a first bin and the cell IDs to a second bin;
   prioritizing the cell group IDs in the first bin based on effective distance between a near PCI and a far PCI and the cell IDs in the second bin based on an effective RSRP value, wherein the effective distance between the near PCI and the far PCI is determined based on relative indices derived from the cell group IDs; and
   allocating the PCI, to the cell, determined based on the prioritized cell group IDs and the cell IDs.

16. The computer-readable medium of claim 15, wherein the operations further comprise determining maximum power transmit for the PCI based on a threshold received power and a power hysteresis between reused PCIs.

17. The computer-readable medium of claim 15, wherein the PCI data is received from a cell search report of a neighbor cell.

18. The computer-readable medium of claim 15, wherein the PCI data comprises a detected PCI list, a cell reuse weightage, a current RSRP threshold value, a PCI count, and maximum and minimum RSRP from neighboring base stations (BTs).

19. The computer-readable medium of claim 15, wherein the near PCI is selected from the near PCI list and the far PCI is selected from the far PCI list.

20. The computer-readable medium of claim 15, wherein the near PCI list comprises PCIs having RSRP higher than the RSRP threshold value and the far PCI list comprises PCIs having RSRP lower than the RSRP threshold value and non-detected PCIs.

21. The computer-readable medium of claim 15, wherein the operations of allocating the PCI further comprise:
   selecting a cell group ID with highest priority from the first bin;
   selecting a cell ID with highest priority from the second bin; and
   determining the PCI, to be allocated to the cell, based on the cell group ID and the cell ID.

* * * * *